United States Patent [19]
Bauer

[11] Patent Number: 6,141,079
[45] Date of Patent: Oct. 31, 2000

[54] CAMERA SYSTEM

[76] Inventor: Fritz Bauer, Pummergasse 20, 3002 Purkersdorf, Austria

[21] Appl. No.: 09/251,623

[22] Filed: Feb. 17, 1999

[30] Foreign Application Priority Data

Feb. 18, 1998 [AT] Austria ...................................... 289/98

[51] Int. Cl.[7] ........................... G03B 23/02; G03B 17/08; G03B 1/18; G03B 17/02
[52] U.S. Cl. ................................ 352/72; 396/27; 396/25; 396/29; 242/326; 242/335; 352/242; 352/243; 352/133; 352/168
[58] Field of Search .............................. 352/72, 242, 243, 352/133, 168; 242/326, 335; 396/419, 25, 27, 29, 420

[56] References Cited

U.S. PATENT DOCUMENTS

| | | | |
|---|---|---|---|
| Re. 32,138 | 5/1986 | Gottschalk | 352/72 |
| 2,883,919 | 4/1959 | Jayet | 396/27 |
| 4,082,436 | 4/1978 | Gottschalk | 352/72 |
| 5,100,228 | 3/1992 | Bauer | 352/72 |

*Primary Examiner*—Alan A. Mathews
*Assistant Examiner*—Raghuveer Bindingnavele
*Attorney, Agent, or Firm*—Henry M. Feiereisen

[57] ABSTRACT

A film camera system, includes a housing with a front end carrying an objective, and a housing wall formed with an opening, a film magazine, and a single connecting member having at least one bore for allowing passage of a film from the film magazine into the housing via the housing opening and vice versa. The connecting member is secured to the film magazine and can be so attached to the housing that the film magazine is selectively positionable with respect to the housing in a first position essentially above the housing and in a second position essentially at the rear end of the housing, while providing a light-tight cover for the housing opening in the first and second positions of the film magazine.

7 Claims, 4 Drawing Sheets

CAMERA SYSTEM

CROSS-REFERENCES TO RELATED APPLICATIONS

This application claims the priority of Austrian Patent Application, Serial No. A 289/98, filed Feb. 18, 1998, the subject matter of which is incorporated herein by reference.

BACKGROUND OF THE INVENTION

The present invention relates, in general, to a camera system, and more particularly to a film camera system of a type including a housing and a film magazine, wherein the housing includes an opening through which the film can be supplied from the opening in the film magazine and can also be returned to the film magazine, and wherein the film magazine—when viewed in the normal position of the camera housing—can be affixed in a first position essentially above the housing and in a second position essentially on the rear side of the housing facing away from the objective.

Known systems of this type allow positioning of the film magazine in the aforementioned two positions in order to obtain better control of the film camera. If the camera is supported by a shoulder tripod, then securing the film magazine on the rear side of the camera balances the weight better on the shoulder of the cameraman. The cameraman then has to support only the weight of the camera and does not have to exert an additional force to prevent the camera from tilting.

Mounting the camera on a stationary tripod also provides better access to the eyepiece. The camera can also more easily be rotated and tilted with the film magazine in the top position.

Conventional film camera systems have two openings capable of receiving the film magazine, whereby the opening which does not receive the film magazine can be closed by a cover plate. Other types of conventional cameras have housing with only one opening. With these cameras, however, different cover and connecting plates are used for covering the housing opening in the two magazine positions.

A drawback of both these camera designs is the need for a relatively great number of parts and fasteners, adding to the complexity of the manufacturing process and making it more difficult to keep the parts in inventory. The individual parts are also difficult to handle, making it harder to operate the camera, since the small cover and connecting parts can be easily misplaced or lost, resulting in lost production time.

SUMMARY OF THE INVENTION

It is thus an object of the present invention to provide an improved camera system, obviating the afore-stated drawbacks.

In particular, it is an object of the present invention to provide an improved camera system in which the film magazine can be easily connected in two positions and which requires only a small number of parts.

It is still another object of the present invention to provide a camera system wherein the camera opening can be conveniently and safely covered, and wherein the cover provides a reliable and impervious seal against light and dust.

These objects, and others which will become apparent hereinafter, are attained in accordance with the present invention by providing a single connecting member having at least one bore for allowing passage of a film from the film magazine into the housing via the housing opening and vice versa, with the connecting member being secured to the film magazine and so attachable to the housing that the film magazine is selectively positionable with respect to the housing in a first position essentially above the housing and in a second position essentially at the rear end of the housing, while simultaneously providing a light-tight cover for the housing opening in the first and second positions of the film magazine.

In this manner, the connecting member supporting the film magazine can close the camera opening in the first and the second positions, thereby eliminating the need for additional components. The connecting member can be attached to the film housing in two positions and combines the opening for the film and the cover for the remaining portion of the housing opening in form of a single element.

According to another feature of the present invention, the connecting member—when viewed in cross-section - includes at least two contact regions which can be brought into contact with the marginal edge of the housing opening in the respective first and second positions and which are symmetrically arranged about a 180° symmetry axis. The film magazine can then be moved from the first position to the second position by a simple rotation about the symmetry axis and fixed in this position on the camera housing. The film magazine can be returned from the second position to the first position by reversing this operation. The magazine position can be changed with only a few manipulative steps, significantly lessening the danger for the connecting member to get lost or needing replacement. Consequently, the reversing operation can be performed by single person without help from an assistant.

According to still another feature of the present invention, the connecting member and the camera housing in the first and second positions of the film magazine are connectable to one another at least along certain sections in a formfitting manner to thereby prevent particles, such as dust, sand and the like, from penetrating into the camera housing.

According to still another feature of the present invention, the connecting member can have a substantially V-shaped cross-section, and the 180° symmetry axis may extend through the line bisecting the angle between the two inner surfaces of the two V legs.

In both, the first and the second positions of the camera housing, the two V legs emulate the missing portion of the camera housing which seals the camera housing upon connection with the connecting member. The V-shaped profile thus provides a mechanically stable attachment to the camera housing.

According to yet another feature of the invention, the connecting member may also include an integrally formed fork-shaped mounting to which a handle is attached. When the camera magazine is moved from the top position to the rear position, the handle automatically moves to the respective opposite position, so that the camera magazine can be easily transported.

According to still another feature of the invention, the longitudinal axis of the handle advantageously extends parallel to one of the V legs. The force required to hold and guide the camera can then be applied approximately between the two partial centers of mass, i.e., between the film magazine and the camera housing, so that the camera system of the invention can be easily carried and controlled.

To effectively seal against light and dust, the marginal edge of the housing opening may include a groove-shaped recess which matches the contact areas of the connecting members.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
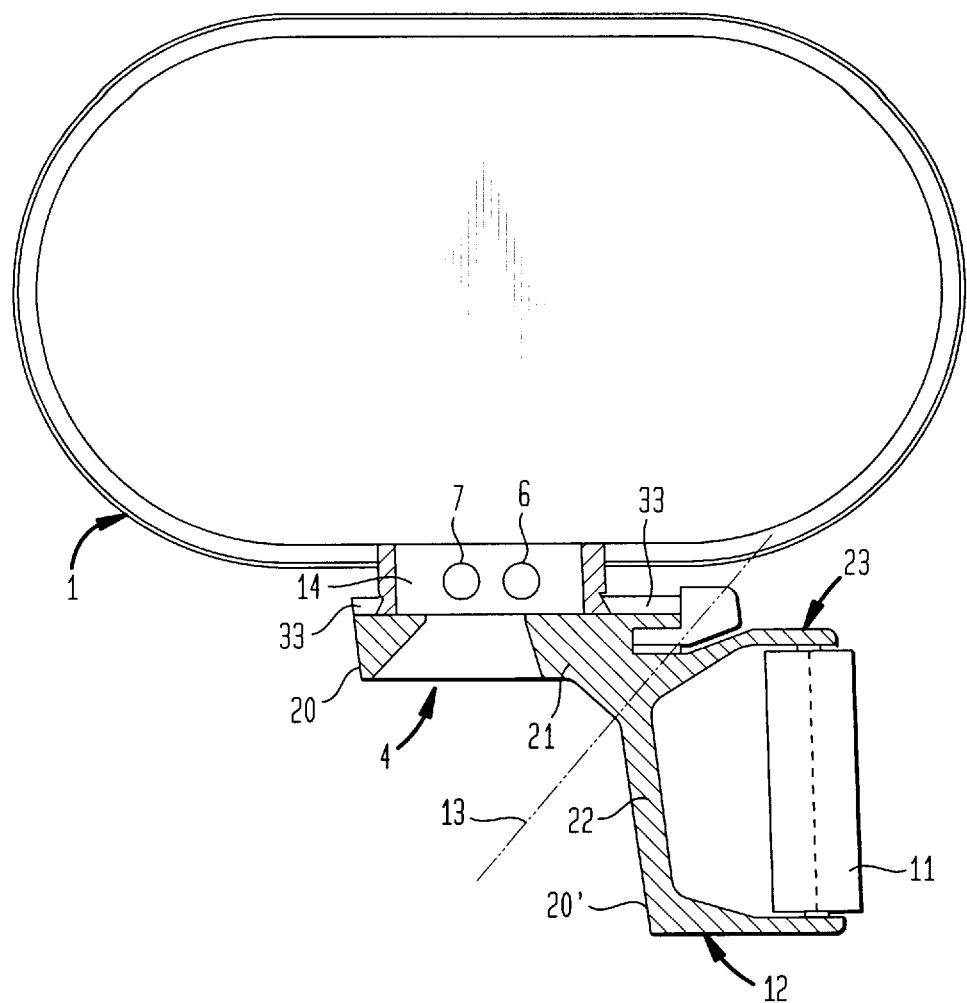
FIG. 1 is a sectional view of a film magazine and a connecting member for use with a film camera system according to the present invention.

Throughout all the Figures, same or corresponding elements are generally indicated by same reference numerals.

Figure 2:
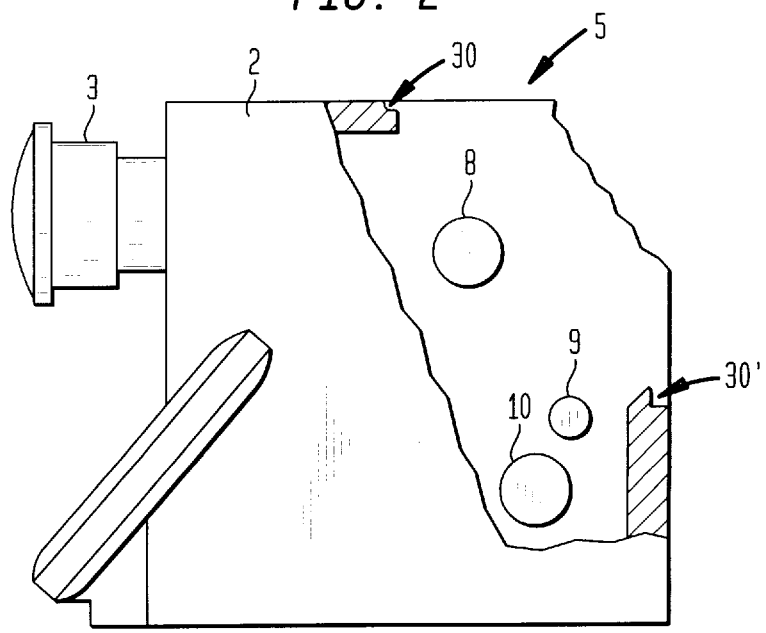
FIG. 2 is a partial sectional view of a camera housing for the film camera system of FIG. 1.

Turning now to the drawing, and in particular to FIG. 1, there is shown a sectional view of a conventional film magazine, generally designated by reference numeral 1 and including a take-off spool and a take-up spool (not shown) capable of conveying a film 19 through a camera housing 2 shown in detail in FIG. 2. The film magazine 1 is provided with a flange-like opening 14 which accommodates two idler rollers 6, 7 to enable the film 19 to move in and out of the camera housing 2.

As shown in FIG. 2, the camera housing 2 has a front end carrying an objective 3 and is formed in opposition to the film magazine 1 with an opening 5 through which the film 19 exiting the film magazine opening 14 can enter and exit the camera housing 2, with the film 19 being routed around rollers 8, 9, 10 during its passage through the housing 2. The film magazine 1 can—when viewed in the normal position of the camera housing 2 illustrated in FIG. 2—be fixedly attached in a first position essentially above the housing 2, as shown in FIG. 3, and in a second position essentially on the rear side of the housing 2 facing away from the objective 3, as shown in FIG. 4.

Figure 3:
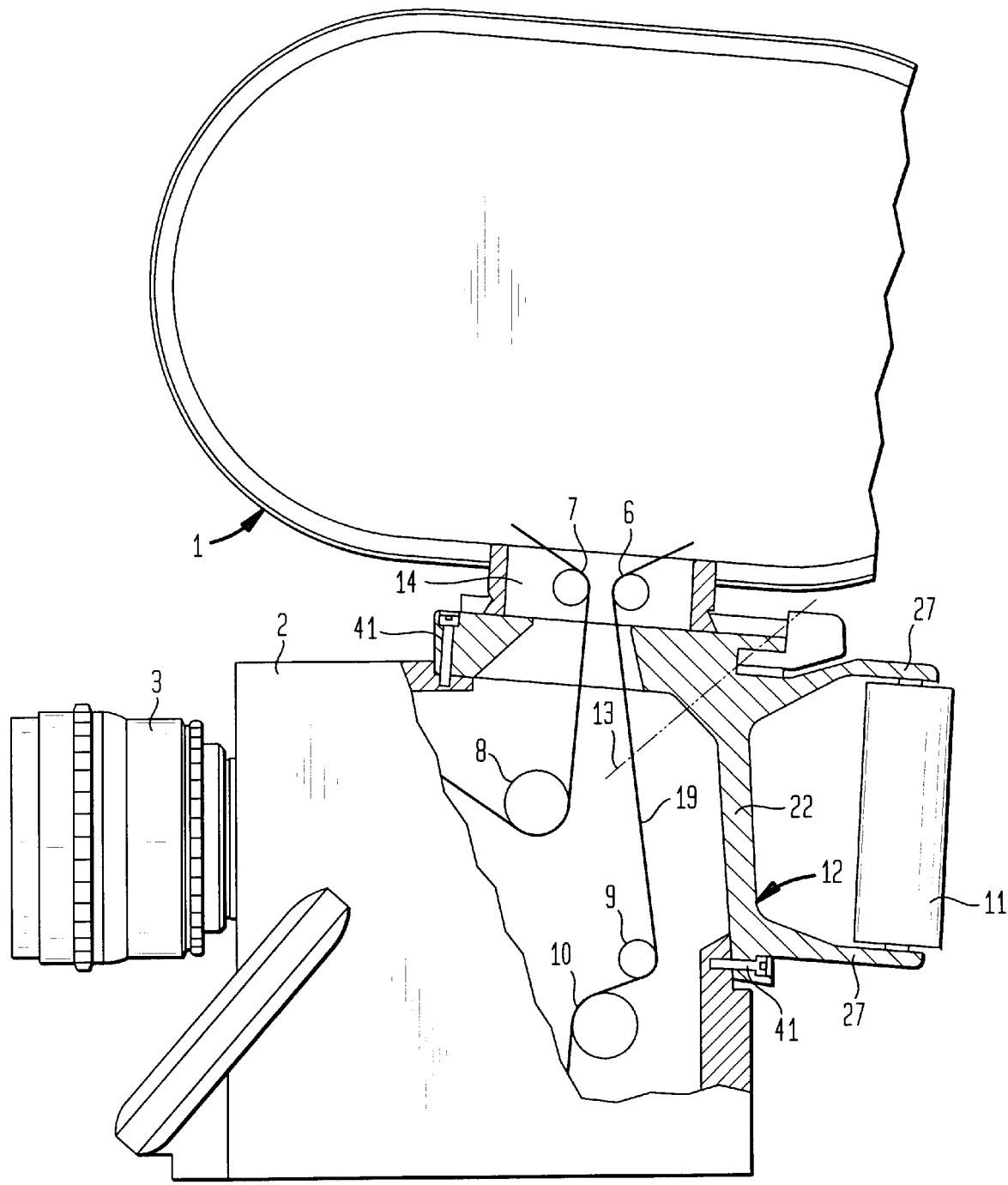
FIG. 3 is a partial sectional view of the film camera system according to the invention in assembled stage, showing the film magazine in a first, upper position.
Figure 4:
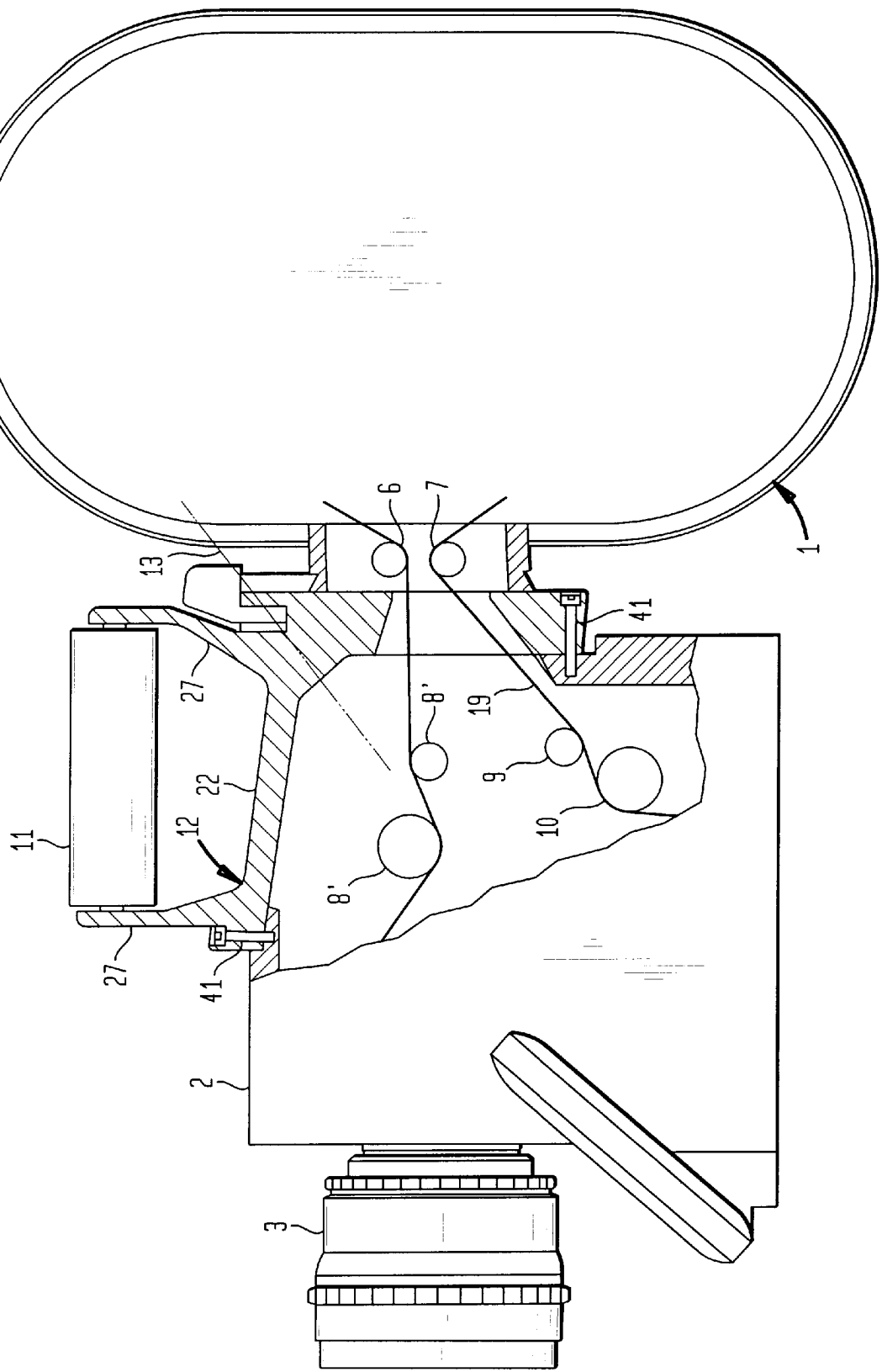
FIG. 4 is a partial sectional view of the film camera system of FIG. 3, showing the film magazine in a second, rear position.
Figure 5:
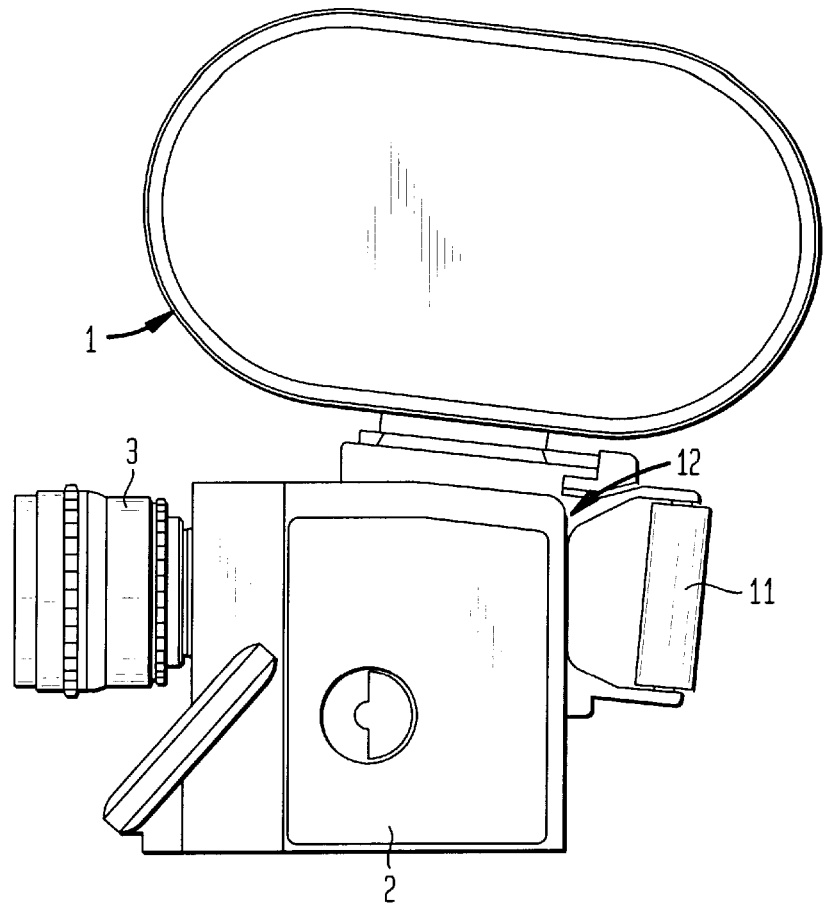
FIG. 5 is a side view of the film camera system of FIG. 3.
Figure 6:
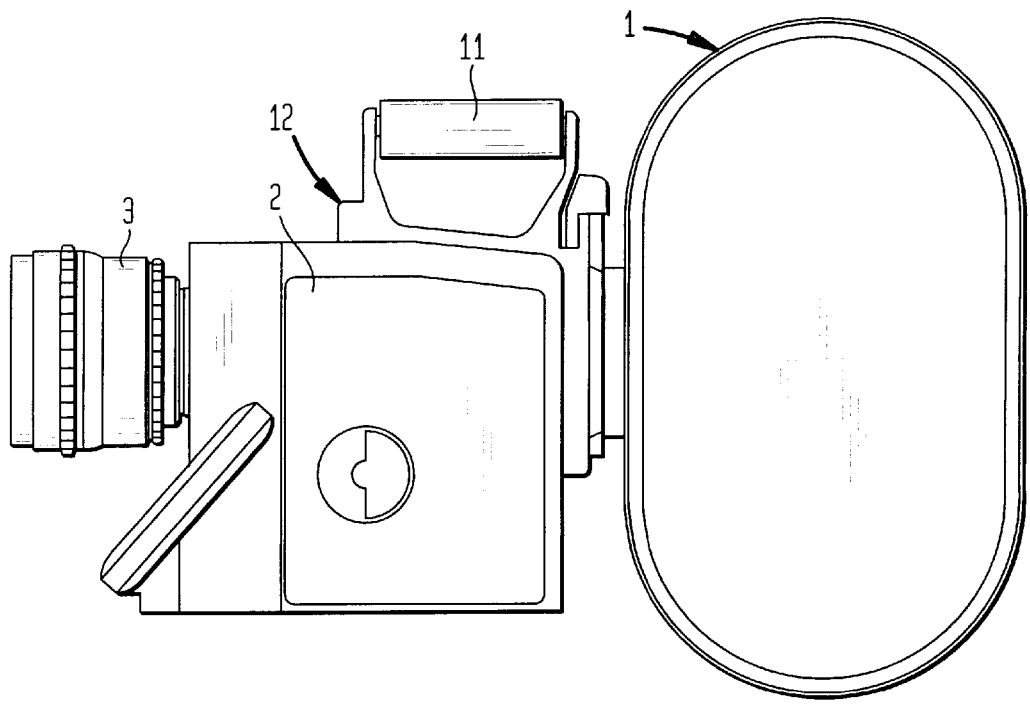
FIG. 6 is a side view of the film camera system of FIG. 4.

In accordance with the invention, the adjustable attachment of the film magazine 1 to the camera housing 2 is effected by a single connecting member, generally designated by reference numeral 12, which is formed with a throughbore 4 for the film 19 and can be coupled to the housing 2 in the first position, shown in FIGS. 3 and 5, as well as in the second position, shown in FIGS. 4 and 6, while simultaneously providing a light-tight seal of the housing opening 5.

As shown in FIG. 1, the connecting member 12 can be coupled to the film magazine 1 via a snap-in element 33 (not shown in detail), with the film magazine opening 14 and the throughbore 4 extending essentially above one another in overlapping relationship. When the film magazine 1 is in the top position, the film 19 is routed through the bore 4 and directed via the housing idler rollers 8, 10, 9, respectively, as illustrated in FIG. 3. On the other hand, when the film magazine 1 is in the rear position, the film 19 follows the path illustrated in FIG. 4 which shows an additional roller 8' for conducting the film 19.

The connecting member 12—when viewed in cross-section—has at least two contact regions 20, 20', which can be brought into contact with the marginal edge of the housing wall bounding the opening 5 in the first and second positions of the film magazine 1, and which are arranged symmetrically about a 180° symmetry axis 13. The camera magazine 1 can be moved from the first position into the second position and vice versa by rotating the connecting member 12 about the symmetry axis 13.

As indicated in FIGS. 1 to 4, the connecting member 12 can be connected in a form-fitting manner with the camera housing 2 at least along certain regions when the film magazine 1 is in the first and second positions, so that the connecting member 12 has substantially a configuration which complements the outside wall of the housing 2.

FIG. 1 further shows that the connecting member 12 has an essentially V-shaped cross section, with the 180° symmetry axis 13 extending along the line bisecting the angle between the inner surfaces of the two V legs 21, 22.

The connecting member 12 has integrally formed therewith a forked mounting 23 for attachment of a handle 11 which defines a longitudinal axis extending parallel to one of the V legs 21, 22, thereby realizing a superior stability of the attachment of the handle 11. By means of the handle 11, a user is able to maintain the camera system according to the invention in balance, so that the camera can be held steady by using only the handle 11, without the need for a separate tripod.

In order to effect a reliable cover that seals against light and dust, the marginal edge of the housing opening 5 is provided with a groove-shaped recess 30, 30' which mates with the contact areas 20, 20' of the connecting member 12. Thus, attachment of the connecting member 12 is facilitated when the film magazine 1 is reversed, and light or particles, such as dust, sand and the like, are prevented from penetrating the inside of the camera housing 2 even after numerous reversals.

The connecting member 12 can be connected to the camera housing 2 by screw fasteners 41, as shown in FIGS. 3 and 4. By properly securing the connecting member 12, the loss in rigidity caused by the housing opening 5 is compensated. Moreover, forces transmitted by the weight of the film magazine 1 and by the handle 11 do not adversely affect the sealing properties of the camera housing 2 against light and dust.

While the invention has been illustrated and described as embodied in a camera system, it is not intended to be limited to the details shown since various modifications and structural changes may be made without departing in any way from the spirit of the present invention.

What is claimed as new and desired to be protected by Letters Patent is set forth in the appended claims:

1. A film camera system, comprising:
   a housing having a front end carrying an objective and an objective-distal rear end, said housing having a housing wall formed with an opening;
   a film magazine; and
   a single connecting member having a bore for allowing passage of a film from the film magazine into the housing via the housing opening and vice versa, said connecting member being securable to the film magazine and so attachable to the housing that the film magazine, when secured to the single connecting member, is selectively positionable with respect to the housing in a first position essentially above the housing and in a second position essentially at the rear end of the housing, while providing a light-tight cover for the housing opening in the first and second positions of the film magazine.

2. The film camera system of claim 1 wherein the connecting member—when viewed in cross-section—comprises at least two contact regions which are adapted for contacting the housing wall when the film magazine is in the first and the second positions and which are arranged symmetrically about a 180° symmetry axis.

3. The film camera system of claim 1 wherein the connecting member has at least certain sections which are connectable to the housing in a form-fitting manner when the film magazine is in the first and the second positions.

4. The film camera system of claim 2 wherein the single connecting member has a V-shaped configuration defined by two legs having inner surfaces positioned at an angle to one another, said 180° symmetry axis extending through a line bisecting the angle between the inner surfaces of the two legs.

5. The film camera system of claim 1 wherein the connecting member has formed thereon a forked mounting for attachment of a handle.

6. The film camera system of claim 4 wherein the connecting member has formed thereon a forked mounting for attachment of a handle, said handle being defined by a longitudinal axis which extends parallel to one of the legs.

7. The film camera system of claim 2 wherein the housing wall of the housing has a recess in the form of a groove which mates with the contact regions of the single connecting member.

* * * * *